(12) United States Patent
Miskech et al.

(10) Patent No.: US 6,644,721 B1
(45) Date of Patent: Nov. 11, 2003

(54) VEHICLE BED ASSEMBLY

(75) Inventors: Peter Miskech, Dearborn, MI (US); David Gary Dahlstrom, Grosse Pointe Farms, MI (US); Keith Alan Kuzmich, Commerce Township, MI (US); Earl Ray Dover, St. Clair Shores, MI (US); Karen Diane Wallag, Dearborn, MI (US); James Matthew Posa, Grosse Ile, MI (US); Joseph Paul Tekelly, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,940

(22) Filed: Aug. 30, 2002

(51) Int. Cl.$^7$ .............................................. B62D 33/02
(52) U.S. Cl. ...................................... 296/183; 296/198
(58) Field of Search ................................ 296/183, 204, 296/198

(56) References Cited

U.S. PATENT DOCUMENTS

| | | | | |
|---|---|---|---|---|
| 3,751,102 A | * | 8/1973 | Stoneburner | 296/3 |
| 4,188,058 A | | 2/1980 | Resa et al. | |
| 4,474,404 A | * | 10/1984 | Hagenbuch | 296/184 |
| 4,505,508 A | * | 3/1985 | Carter | 105/423 |
| 4,984,673 A | | 1/1991 | Saito et al. | |
| 5,454,620 A | * | 10/1995 | Hill et al. | 296/184 |
| 5,575,525 A | | 11/1996 | Walworth et al. | |
| 5,664,451 A | | 9/1997 | Schultz et al. | |
| 5,730,486 A | | 3/1998 | Jurica | |
| 5,938,272 A | | 8/1999 | Jurica et al. | |
| 6,128,815 A | | 10/2000 | Jurica et al. | |
| 6,142,549 A | | 11/2000 | Clare et al. | |
| 6,170,905 B1 | | 1/2001 | Jurica | |
| 6,308,411 B1 | | 10/2001 | Wright et al. | |

FOREIGN PATENT DOCUMENTS

WO    WO 01/66301 A1    9/2001

OTHER PUBLICATIONS

Automotive Industries, Sep. 1989, "A Plastic Pickup".*

* cited by examiner

Primary Examiner—Dennis H. Pedder
(74) Attorney, Agent, or Firm—Raymond L. Coppiellie; Brooks & Kushman

(57) ABSTRACT

A vehicular bed assembly 12 and a method 100 for making the vehicular bed assembly 12 by a process which requires the use of a roll 103 of material 104. Particularly, material 104 from the roll 103 is continually fed through a stamping or mold assembly 110 which forms raised stiffening beads on the material 104. The material 104 is then continually fed through a cutter 118 in which the received material is 103 selectively cut, thereby forming panels or segments, such as and without limitation segment or panel 120, which are used to form the walls 14, 16, 20, 22 and which are further used to form the floor pan 18. In this manner, the methodology 100 allows for a variety of dissimilarly sized bed assemblies 12 to be easily and efficiently produced.

6 Claims, 3 Drawing Sheets

VEHICLE BED ASSEMBLY

BACKGROUND OF INVENTION

1. Field of the Invention

The present invention generally relates to a method for making a vehicle bed assembly and to a vehicle bed assembly which is made in accordance with the method and more particularly, to an efficient method for making a variety of different vehicle bed assemblies by the use of a single process or methodology and a single set of tooling.

2. Background of the Invention

A vehicular bed or bed assembly typically includes a floor bed or pan, a pair of, sidewalls which respectively and typically include or which are selectively attached to a wheelwell or wheel housing, a front panel or wall, and a rearwall or panel which is typically formed upon a selectively movable tailgate. Particularly, these members, when operatively and selectively placed upon a vehicle, such as a truck, cooperatively define and provide a storage environment or "space" within which various items may be securely placed.

While the foregoing assembly does provide such a desired storage space, it does. have some disadvantages. By way of example and without limitation, several uniquely configured tools or apparatuses are typically utilized to create each of the walls or each vehicular bed assembly, and new tooling assemblies are required to be designed and built each time that the size of a newly produced bed assembly is to be changed or modified from the size of a previously produced bed assembly (e.g., for new models or types of vehicles), thereby undesirably increasing the overall cost and complexity of vehicular production.

Further, typically the wheelwell members are coupled to the floor bed by the use of flanges which are coupled to or which are formed upon the floor bed. Such flanges increase the overall cost and complexity of vehicular production and concomitantly provide an unaesthetically pleasing overall appearance due to the space or "crevice" which often exists between an attached wheelwell member and the floor pan. Moreover, the space or crevice allows for the ingress of moisture which may cause the vehicular bed assembly to rust or to structurally deteriorate.

The present invention overcomes these drawbacks in a new and novel fashion.

SUMMARY OF INVENTION

It is a first non-limiting advantage of the present invention to provide a vehicular bed assembly which overcomes some or all of the previously delineated disadvantages of prior vehicular bed assemblies.

It is a second non-limiting advantage of the present invention to provide a method for making a vehicular bed assembly which overcomes some or all of the previously delineated disadvantages of prior methods of making a vehicular bed assembly.

It is a third non-limiting advantage of the present invention to provide a vehicle bed assembly having a floor panel with at least one portion having a boundary edge; and a wheel housing member having a mating edge which has substantially the same shape as the boundary edge of the at least one portion and which selectively overlays and is attached to the boundary edge of the at least one portion, thereby cooperating with the boundary edge of the at least one portion to attach the wheel housing member to the floor panel.

It is a fourth non-limiting advantage of the present invention to provide a method for making a vehicular bed assembly. Particularly, the method includes the steps of forming a substantially identical first, second, third, fourth, fifth, sixth, and seventh panels, each of the panels having a substantially identical shape; coupling the fourth panel to the fifth panel, thereby forming a floor bed; coupling the floor bed to a vehicle; coupling the first to the second panel, thereby forming a first sidewall; coupling the third panel to the sixth panel, thereby forming a second sidewall; coupling the first and second sidewalls to the floor bed and to the seventh panel, thereby forming a vehicular bed assembly.

It is a fifth non-limiting advantage of the present invention to provide a method for making a vehicular bed assembly. Particularly, the method includes the steps of providing a roll, of material; drawing a first amount of material from the roll; stamping the certain amount of drawn material, thereby forming beads in the certain amount of rolled material; cutting the certain amount of rolled material, thereby forming, a first sidewall; drawing a second amount of material from the roll; stamping the second amount of material, thereby forming beads in the second amount of material; cutting the second certain amount of material, thereby forming a backwall; drawing a third amount of material from the roll; stamping the third amount of material, thereby forming beads in the third amount of material; cutting the third amount of material, thereby forming a second sidewall; drawing a fourth amount of material from the roll; stamping the fourth amount of, material, thereby forming beads in the fourth amount of material; cutting the fourth amount of material, thereby forming a frontwall; drawing a fifth amount of material from the roll; stamping the fifth amount of material, thereby forming beads in the fifth amount of material; cutting the fifth amount of material, thereby forming a floor pan; coupling the first and second sidewalls and frontwall to the floor pan; providing a tailgate; coupling the backwall to the tailgate; movably coupling the tailgate to the floor pan; and coupling the frontwall to the first and second sidewalls, thereby forming a vehicular bed assembly. These and other features and advantages of the present invention will become apparent from a reading of the following detailed description of the preferred embodiment of the invention and by reference to the following claims.

DETAILED DESCRIPTION

Figure 1:
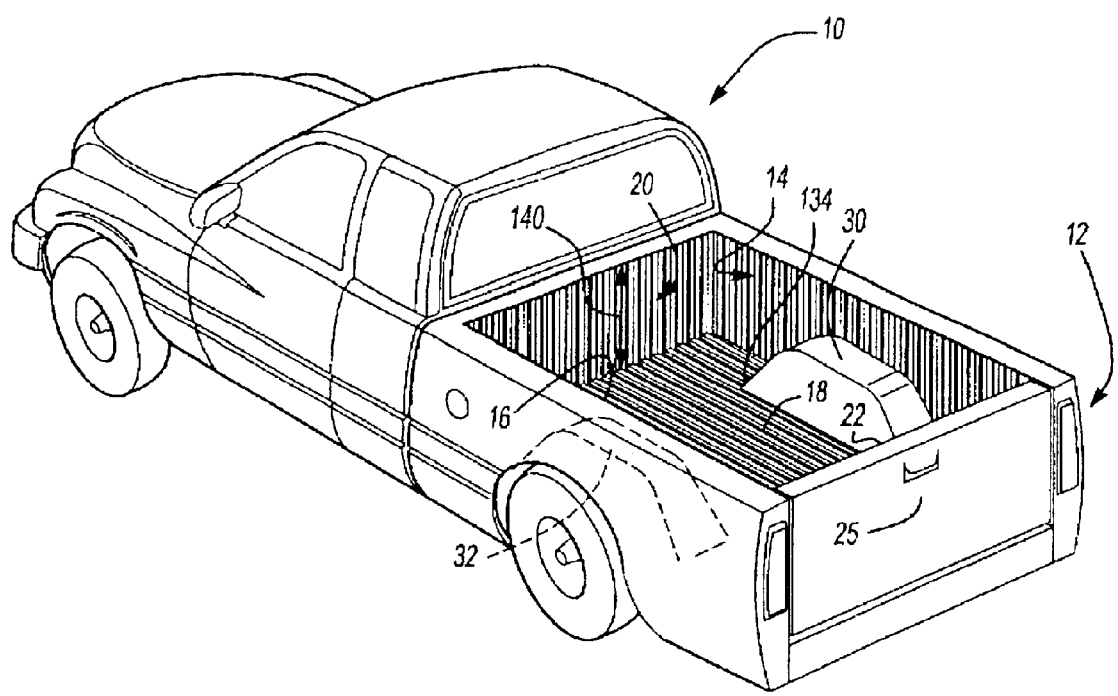
FIG. 1 is a vehicle incorporating a bed which is made in accordance with the teachings of the preferred embodiment of the invention.

Referring now to FIG. 1, there is shown a vehicle 10 having a bed assembly 12 which is made in accordance with the teachings of the preferred embodiment of the invention. At the outset, it should be realized that the present invention is not limited to a particular type of vehicle and that vehicle 10 is shown for illustrative purposes only and is not meant to limit the applicability of the present invention to a particular type of vehicle. Rather, the present invention is applicable to a wide variety of dissimilar vehicles.

Particularly, as shown, the vehicular bed assembly 12 includes a pair of substantially identical sidewalls 14, 16, a floor pan or floor bed 18, a frontwall 20, and a backwall 22 which is usually formed on or selectively attached to a selectively movable tailgate 25 which is selectively and movably coupled to the floor pan 18. As is further shown, the vehicular bed assembly 12 includes a pair of substantially identical wheel housings 30, 32 which are selectively coupled to the floor pan 18 and which are respectively and selectively coupled to the sidewalls 14, 16. Moreover, the frontwall 20, and the sidewalls 14, 16 are also selectively coupled to the floor bed 18. Further, the vehicular bed assembly 12 is selectively coupled to the frame (not shown) of the vehicle 10 by the use of conventional fasteners or by the use of substantially any other desired methodologies and assemblies. Particularly, according to the teachings of the preferred embodiment of the invention, the vehicular bed assembly 12 is efficiently and cost effectively made by a process which is delineated below and which allows various dissimilarly sized vehicle bed assemblies 12 to be produced by the use of one "set" of tooling.

Figure 2:
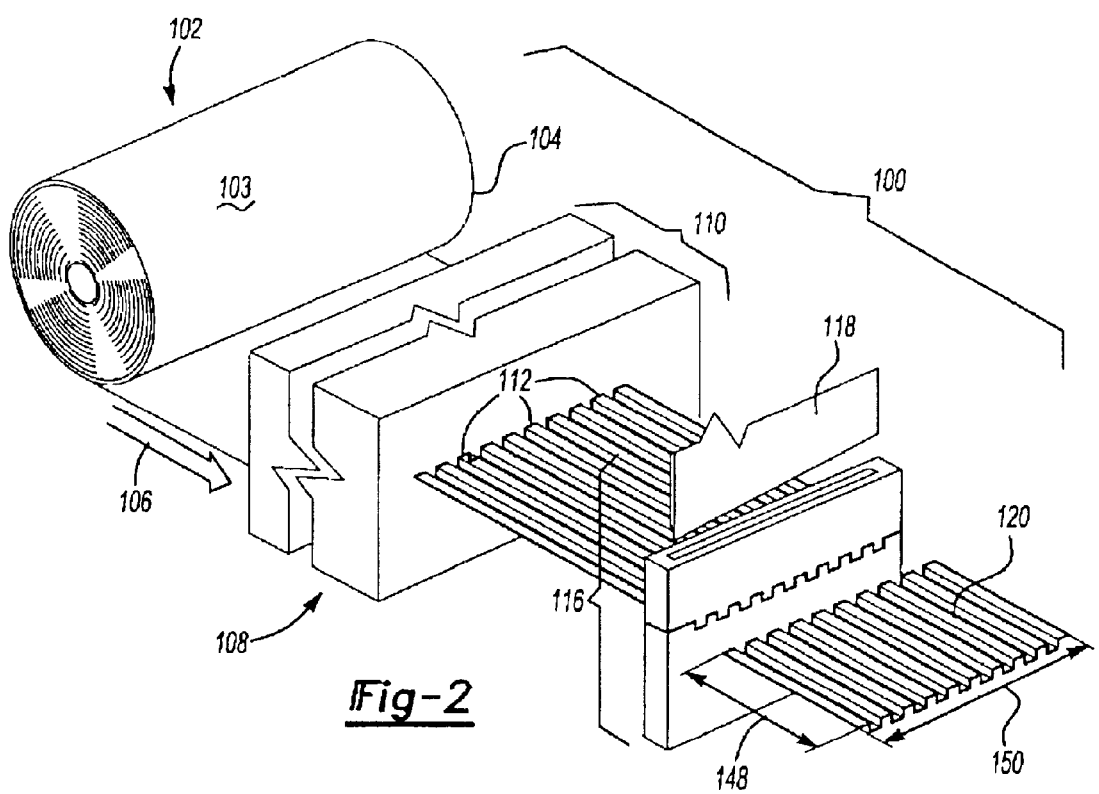
FIG. 2 is a flow chart illustrating a sequence of steps which cooperatively comprise the vehicular bed formation methodology of the preferred embodiment of the invention.

Referring now to FIG. 2, there is shown a flowchart or methodology 100 which illustrates the vehicular bed formation methodology of the preferred embodiment of the invention. Particularly, the methodology 100 includes a first step 102 in which a roll 103 of a certain relatively strong material 104 (e.g., commercially available stainless steel material) is provided. Other non-limiting examples of material 104 include, but are not limited to, commercially available composite or plastic type material. Step 106 follows step 102 and, in this step 106, the material 104 is extended, drawn, or extruded from the roll 103 (e.g., such as by selectively pulling the material 104 from the roll 103). Step 108 follows 106 and, in this step 108, the drawn material 104 is continually fed through a mold or stamping assembly 110 which forms raised stiffening beads 112 on the received material 104. In one non-limiting embodiment, these raised stiffening beads 112 have a substantially rectangular cross-sectional area, although other geometries may be employed. Step 116 follows step 108 and, in this step 116, the material 104 is selectively or continually fed through a cutter or cutting assembly 118 which cuts the material 104 to a desired length and shape, thereby selectively producing segments of material 104, such as and without limitation the selectively formed segment or panel member 120. In one non-limiting embodiment, the cutting assembly may comprise a robotic arm which includes a cutting device and which is operable under stored program control.

That is, as shown, the cutter 118 cuts the continually fed or drawn material 104 to any desired shape and size and thusly the continually or selectively fed material 104 may be "sized" to any desired length. In this manner, the continually or selectively fed material 104 is cut to separately form the sidewalls 14, 16, frontwall 20, and the backwall 22. Particularly, the height 140 of each wall 14, 16, 20, 22 is substantially equal to the height 148 of each panel or produced segment, such as and without limitation the segment or panel member 120. The width 150 of each segment or panel member, such as and without limitation the segment or panel 120, is fixed to be the length required by the wall 14, 16, 20, and 22 which it is to respectively form. In this manner, the sidewalls 14, 16, the frontwall 20, and the backwall 22 are formed. Moreover, while one such panel or member, such as member 120, may be used to form the floor bed 18, two or more substantially identical segments, such as segments 120, may alternatively be selectively joined to form this floor bed 18. In an alternate embodiment of the invention, two or more substantially identical segments, such as segments 120, may also be selectively joined to form a sidewall 14, 16 or a wall 20, 22 in a manner which is more fully delineated below. Thus, it should be appreciated that a larger bed assembly 12 may be created by causing two or more segments, such as segment 120, to form each of the walls 14, 16, 20, 22 and floor panel 18 and/or by increasing the height of each wall 14, 16, 20, 22 by causing more of the drawn material 103 to be "fed through" the cutter 118 before a cut is made thereby increasing the height 148 of each produced segment 120.

Figure 3:
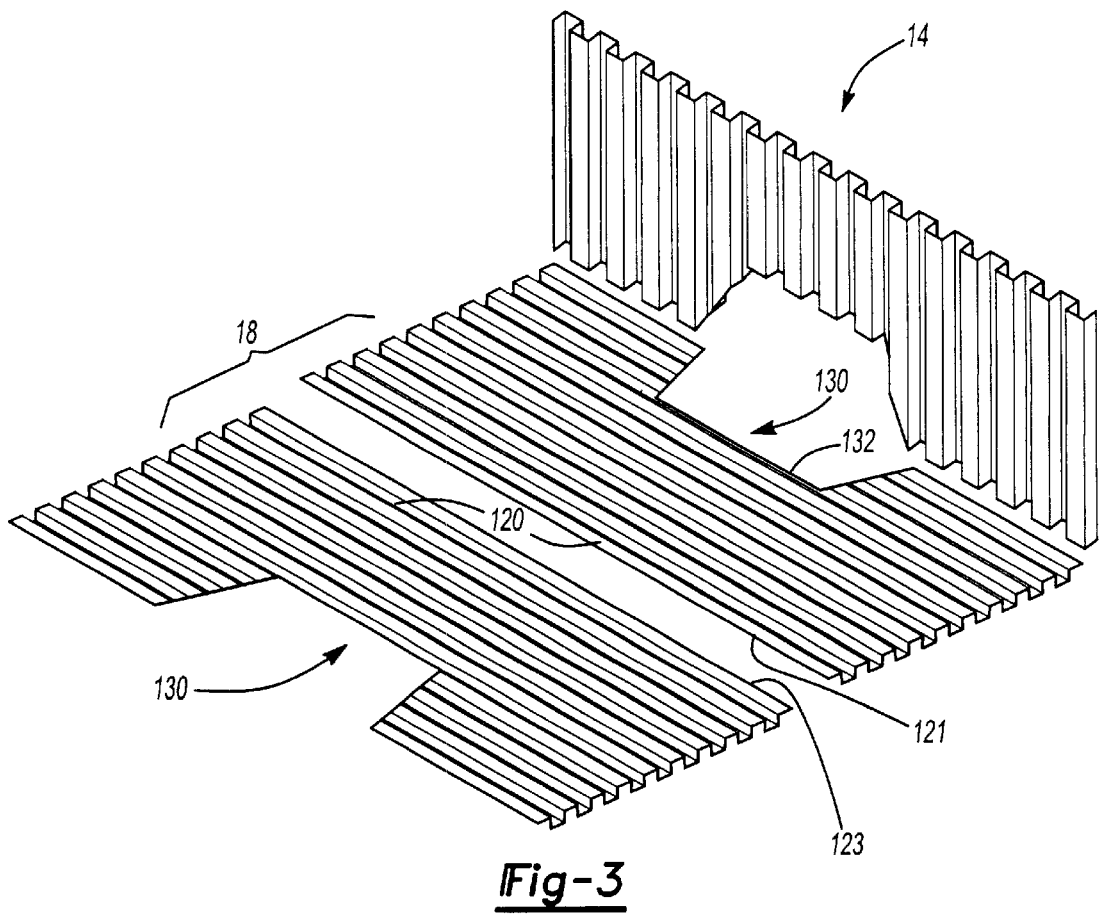
FIG. 3 is a top unassembled view of panel segments which may be selectively joined to form the floor panel and a sidewall which are shown in FIG. 1.
Figure 4:
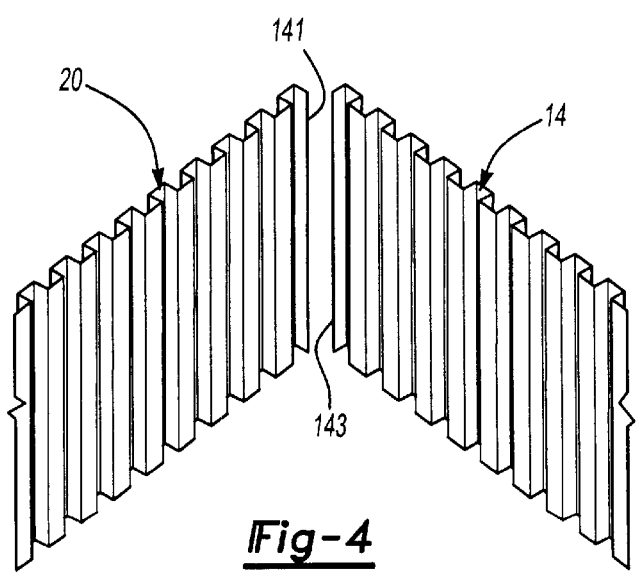
FIG. 4 is a perspective unassembled view of a pair of produced panel segments which may respectively and selectively form the frontwall and a sidewall which are shown in FIG. 1.

That is, as best shown in FIG. 3, two of the formed segments 120 which may be used to form the floor pan or bed 18 are joined or attached along respective longitudinal edges 121, 123 by a conventional adhesive or by any other conventional "joining" technique or methodology, such as by welding or by the use of mechanical fasteners. That is, it should be appreciated that the two segments 120 used to form floor pan 18 are shaped by mold 110 and cut by cutter 118 to create mating edges 121, 123, whereby edges 121, 123 cooperate to allow the produced segments to cooperatively form a substantially "even" or "flat" floor pan 18 and to allow these segments 120 to be substantially and seamlessly coupled. Similar attachment techniques may be used to join the segments, such as segments 120, which selectively and cooperatively form a wall 14, 16, 20, 22. That is, two or more segments 120 may form a wall 14, 16, 20, 22 (e.g., such as a frontwall 20 and sidewall 14) and may be joined along respective edges 121, 123 by use of a conventional adhesive or by any other conventional "joining" technique or methodology. That is, in one non-limiting embodiment, the segments, each segment 120, which emerges from the cutter 18 has a substantially identical edge 121, 123, thereby allowing these segments cooperatively form a single wall 14, 16, 20, 22. Such produced segments may also be used to form a single wall 14, 16, 20, 22, according to another non-limiting or alternate embodiment which is best shown in FIG. 4, by the use of an additional cutting step to remove flange 125 from each respective edge 121, 123 of the panels 120 which are to cooperatively form a wall 14, 16, 20, 22, thereby forming respective edges 141, 143. Moreover, a segment which forms a first of the walls 14, 16, 20 may be selectively joined to a segment which forms a second of the walls 14, 16, 20 along respective edges 141, 143 or 121, 123. The segments which respectively form the walls 14, 16, 20 are selectively attached to the segments which form the floor panel 18 by the use of a conventional adhesive material, by welding, by a fastener assembly, or by any other desired technique.

A shown best in FIG. 1, the segments, such segments 120 which are used to form floor panel 18 and which are respectively attached to sidewalls 14, 16, have an aperture or an indentation portion or a "cutout" potion 130 which includes or which forms a boundary edge 132. It should be appreciated that an edge 132 of a portion 130 is of a certain shape and that, in the preferred embodiment of the invention, portions 130 are formed by a conventional cutting assembly. Further, the underside of each wheel housing 30, 32 include an edge 134 which is shaped in a substantially identical manner to each edge 132. Hence, each respective edge 134 of wheel housings 30, 32 respectively overlays and is matingly attached to a unique one of the edges 132, thereby allowing the wheel housings 30, 32 to be securely attached to the floor pan 18 by a conventional adhesive by a welded connection, or by any other conventional "joining"

methodology, thereby obviating the need for a fastener or flange member and forming respective and substantially "seamless" connections (i.e., connections which do not produce cavities or crevices). In this manner, the use of connection flanges is obviated. Further, the floor pans 30, 32 may be respectively attached to the sidewalls 14, 16 in a conventional manner, such as by use of a welded or adhesive connection or by the use of a mechanical fastener assembly. Further, a tailgate 25 is provided and/or produced and the backwall 22 is operatively disposed upon the tailgate 25 (by a conventional adhesive, by welding, by a fastener assembly, or by any other desired technique) and the tailgate 25 is movably coupled to the floor pan 18 by the use of hinges (not shown) or by the use of other conventional techniques. In this manner, a vehicular bed assembly 10 is selectively created.

It should be understood that the invention is not limited to the exact construction or methodology which has been previously delineated, but that various changes and modifications may be made without departing from the spirit and the scope of the invention as is more fully delineated in the following claims.

Further, it should be appreciated that the forgoing process or methodology 100 allows for the creation of walls 14, 16, 20, 22 and a floor pan 18 having substantially any desired length and that by providing a roll 103 of a desired material thickness, the width of these walls 14, 16, 20, 22 may be dynamically changed and modified. Further, a vehicle bed having a desired size may be formed without changing the tooling (i.e., the mold 110 and the cutter 118) used within the methodology 100. That is, it should be apparent that by controllably varying the number of panels or segments, such as segment 120, which cooperatively form the floor pan 18 or the walls 14, 16, 20, 22, one may dynamically alter the width or size of the formed vehicular bed assembly 12. Further, it should be appreciated that in a non-limiting alternate embodiment of the invention the material 104 may not be continually drawn through the cutter 118 and the mold 110. Rather, certain portions of the material 104 may be discretely and selectively placed in the mold 110 and the cutter 118 to discretely form the panels, such as panel 120. Further, in one non-limiting embodiment of the invention, tailgate 25 and backwall 22 are not employed and the vehicular bed assembly 10 comprises only the sidewalls 14, 16, frontwall 20 and the floor pan 18.

What is claimed is:

1. A vehicle bed assembly comprising:
   a multi-piece floor panel having at least one portion having a boundary edge;
   at least one side panel connected to the multi-piece floor panel; and
   a wheel housing member having a mating edge which is substantially the same shape as said boundary edge of said at least one portion and which selectively overlays and is attached to said boundary edge of said at least one portion, thereby cooperating with said boundary edge of said at least one portion to attach said wheel housing member to said floor panel;
   wherein the multi-piece floor panel and the at least one side panel are constructed from panels having a substantially equal size.

2. The vehicle bed assembly of claim 1 wherein said multi-piece floor panel is formed from first and second panels, the first and second panels being connected together along a common edge.

3. The vehicle bed assembly of claim 1 wherein said at least one portion comprises a cut out portion.

4. The vehicle bed assembly of claim 2 wherein the first and second panels each have a plurality of substantially identical raised stiffening ribs.

5. The vehicle bed assembly of claim 1 wherein said boundary edge which is formed by said at least one portion is adhesively bonded to said mating edge of said wheel housing member.

6. The vehicle bed of claim 4 wherein said multi-piece floor panel is made from stainless steel material.

* * * * *